(12) United States Patent
Brott et al.

(10) Patent No.: US 7,637,685 B2
(45) Date of Patent: Dec. 29, 2009

(54) RETENTION MEMBER FOR BALL SOCKET JOINT

(75) Inventors: Sanders R. Brott, Seymour, IN (US); James W. Acker, Brownstown, IN (US)

(73) Assignee: Valeo Sylvania LLC

( * ) Notice: Subject to any disclaimer, the term of this patent is extended or adjusted under 35 U.S.C. 154(b) by 313 days.

(21) Appl. No.: 11/581,199

(22) Filed: Oct. 13, 2006

(65) Prior Publication Data

US 2008/0087127 A1    Apr. 17, 2008

(51) Int. Cl.
F16B 2/02    (2006.01)
F21V 19/02    (2006.01)

(52) U.S. Cl. .................. 403/290; 403/122; 362/515; 362/524; 362/528

(58) Field of Classification Search .............. 403/56, 403/76, 70, 114, 115, 122–144, 90, 290; 362/425, 515, 528
See application file for complete search history.

(56) References Cited

U.S. PATENT DOCUMENTS

| | | | | |
|---|---|---|---|---|
| 3,429,598 A | * | 2/1969 | Scheublein, Jr. et al. .... | 403/128 |
| 5,079,676 A | * | 1/1992 | Lisak .................. | 362/524 |
| 5,355,287 A | * | 10/1994 | Denley .................. | 362/524 |
| 5,381,317 A | * | 1/1995 | Schmitt et al. ........... | 362/324 |
| 5,539,625 A | * | 7/1996 | Turley et al. ............ | 362/524 |
| 5,775,794 A | * | 7/1998 | Schmitt .................. | 362/507 |
| 5,779,343 A | * | 7/1998 | Denley .................. | 362/507 |
| 5,897,202 A | * | 4/1999 | Denley .................. | 362/463 |
| 5,947,249 A | * | 9/1999 | Tobiasz ................. | 192/85 C |
| 6,050,712 A | * | 4/2000 | Burton .................. | 362/529 |
| 6,257,747 B1 | * | 7/2001 | Burton .................. | 362/524 |
| 6,447,154 B1 | * | 9/2002 | Denley .................. | 362/528 |
| 6,450,674 B2 | * | 9/2002 | Denley .................. | 362/528 |
| 6,474,850 B1 | * | 11/2002 | Burton .................. | 362/524 |
| 6,773,153 B2 | * | 8/2004 | Burton .................. | 362/528 |
| 6,913,374 B2 | * | 7/2005 | Burton .................. | 362/524 |
| 7,040,788 B2 | * | 5/2006 | Brazas et al. ........... | 362/512 |
| 7,066,632 B2 | * | 6/2006 | Burton .................. | 362/524 |
| 7,090,384 B2 | * | 8/2006 | Hendricks ............... | 362/524 |
| 7,118,259 B2 | * | 10/2006 | Fladhammer ............. | 362/515 |

* cited by examiner

*Primary Examiner*—Victor MacArthur
(74) *Attorney, Agent, or Firm*—William H. McNeill

(57) ABSTRACT

An adjustment device (10) having a socket (12) attached to an article (14) to be adjusted; a housing (16) remote from the article (14); a shaft (18) moveable along a longitudinal axis (20) in the housing (16), the shaft (18) having a socket end (22) engaging the socket (12); a clutch (24) to allow slippage of the shaft (18), the improvement wherein a friction brake (26) is positioned in the housing (16) and engages the socket end (22) of the shaft (18).

1 Claim, 5 Drawing Sheets

RETENTION MEMBER FOR BALL SOCKET JOINT

TECHNICAL FIELD

This application relates to adjustment devices and more particularly to adjustment devices for automotive headlamps. Still more particularly, it relates to such devices containing means for preventing an adjuster screw from inadvertently disengaging from a ball socket.

BACKGROUND ART

Current headlamp adjusters usually have a clutch feature incorporated therein. The clutching feature is designed to prevent the destruction of the adjuster if the headlamp is significantly over aimed. Typically, they are designed such that the clutching torque of the adjuster is lower than the destruction torque of the adjuster or the destruction torque of the headlamp.

For example, in one known type of adjuster the clutching action can be activated anywhere in between both ends of travel of the adjusting screw and the amount of force applied in the direction of the screw axis on the ball socket is substantial enough to disengage the adjustment screw from the ball socket. If the clutching torque of the adjuster is too low the adjuster may clutch prematurely and not be able to adjust the headlamp; however, the problem remains that the clutching torque required to adjust the headlamp properly is higher than the destruction torque of the ball socket.

DISCLOSURE OF INVENTION

It is, therefore, an object of the invention to obviate the disadvantages of the prior art.

It is another object of the invention to enhance headlamp adjusters.

These objects are accomplished, in one aspect of the invention, by the provision, in an adjustment device including a socket attached to an article to be adjusted; a housing remote from said article; a shaft moveable along a longitudinal axis in said housing, said shaft having a socket end engaging said socket; a clutch to allow slippage of said shaft, the improvement comprising: a friction brake positioned in said housing and engaging said end of said shaft. The friction brake increases the torque required to disengage the adjustment screw from the ball socket.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
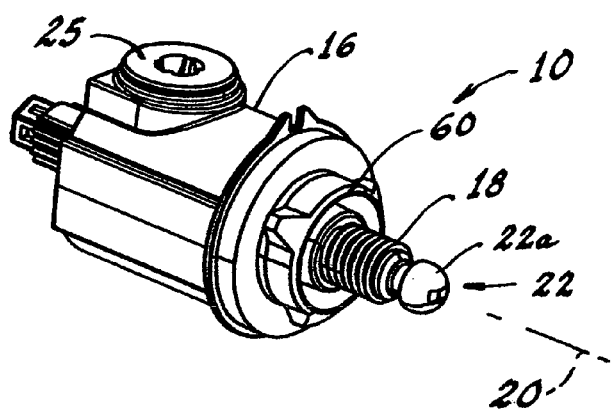
FIG. 1 is perspective view of a prior art adjuster.
Figure 2:
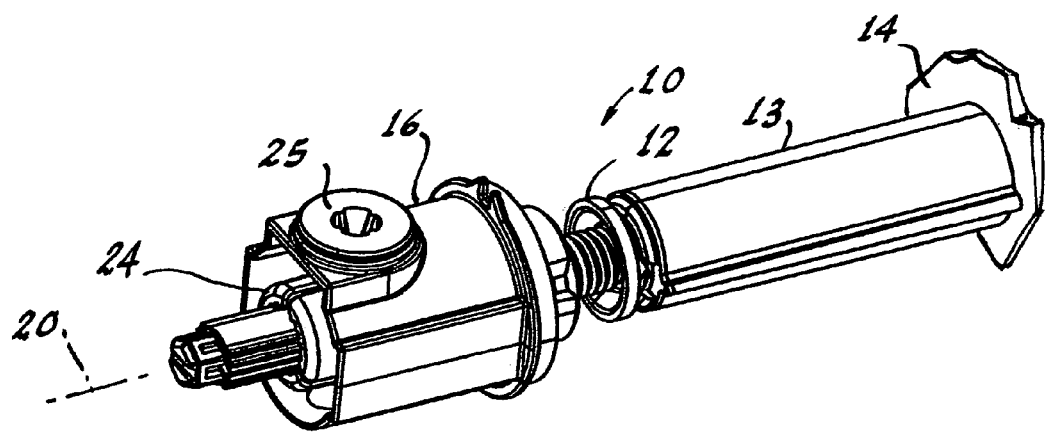
FIG. 2 is a perspective view of a prior art adjuster and a ball socket.
Figure 3:
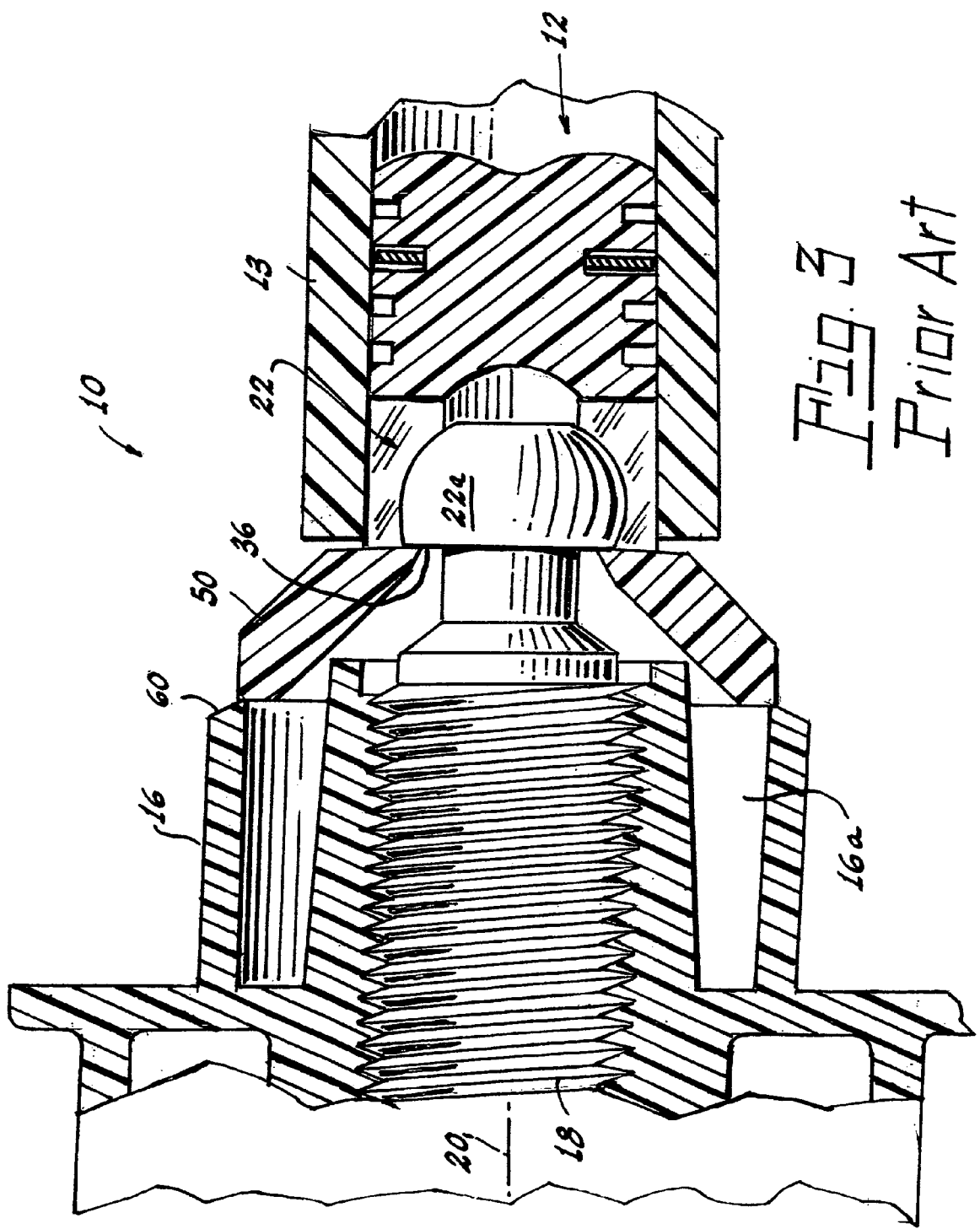
FIG. 3 is a sectional view of an adjuster and ball socket.
Figure 4:
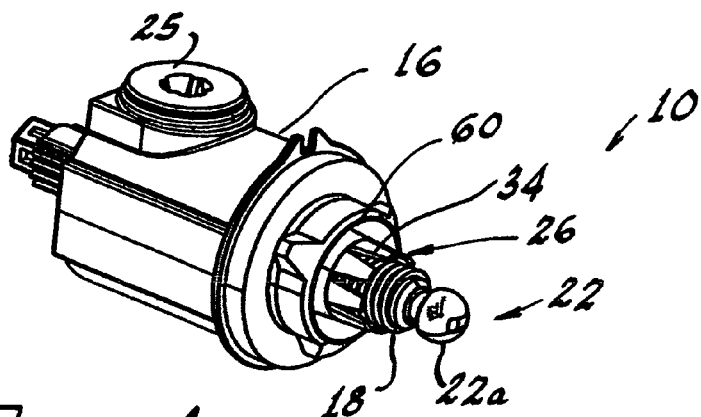
FIG. 4 is a perspective view of an adjuster employing an embodiment of the invention.
Figure 5:
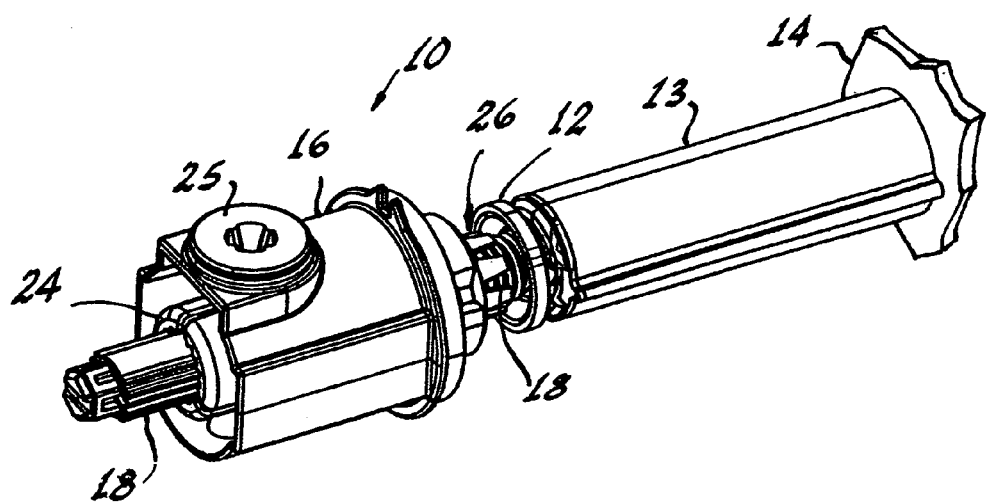
FIG. 5 is a perspective view of an adjuster and ball socket employing an embodiment of the invention.
Figure 6:
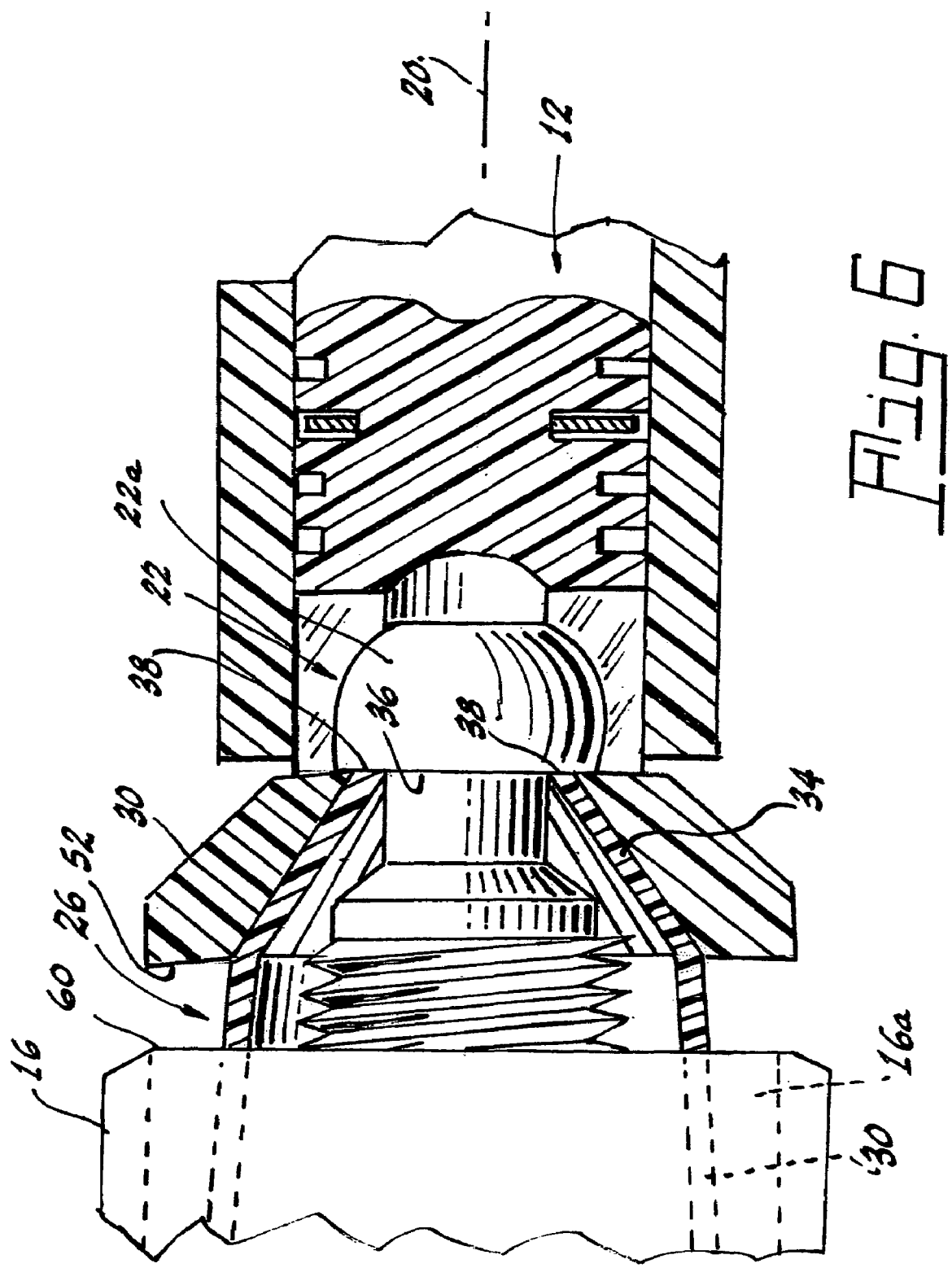
FIG. 6 is a sectional view of an embodiment of the invention.
Figure 7:
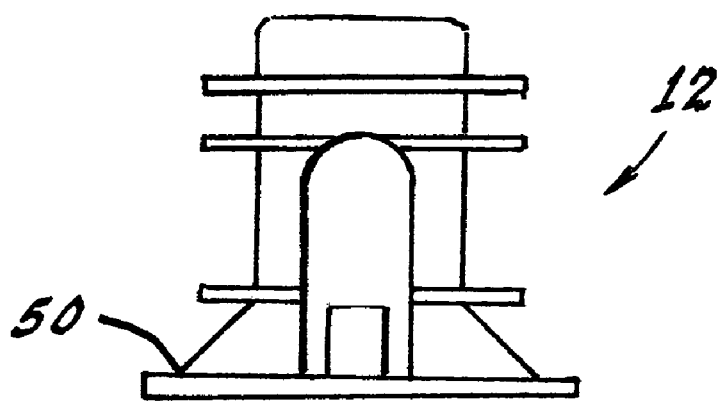
FIG. 7 is an elevational view of a ball socket.
Figure 8:
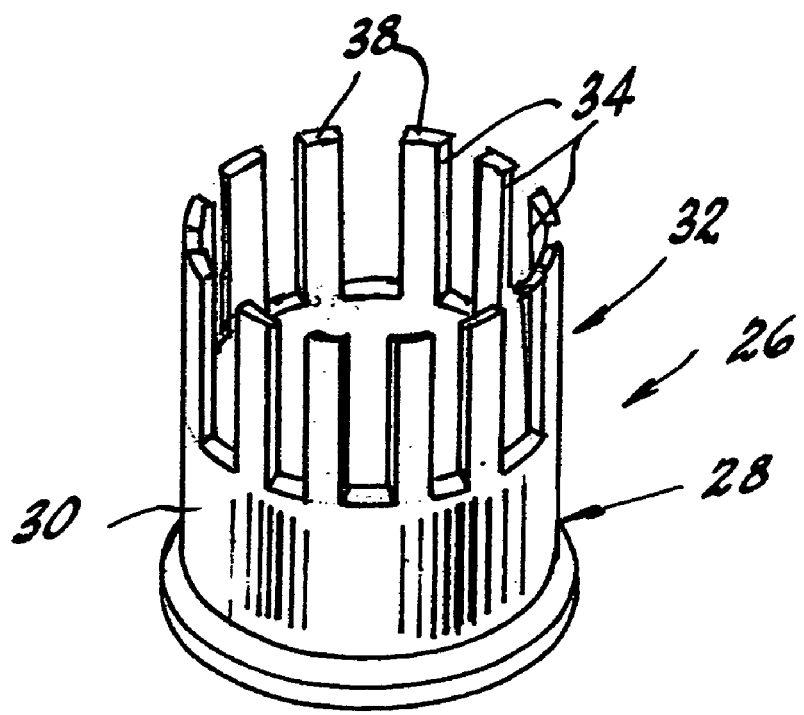
FIG. 8 is a perspective view of a friction brake for use with the invention.

Referring now to the drawings with greater particularity, there is shown in FIGS. 1 and 2 and 3 a prior art adjustment device 10 including a socket 12 having a body 13 attached to an article 14 to be adjusted. Article 14 can be separate from or a part of body 13. Article 14 can be the reflector of an automotive headlamp. A housing 16 contains a threaded shaft 18 that is moveable along a longitudinal axis 20. The threaded shaft 18 has a socket end 22 in the form of a ball 22a at one end thereof that mates with the socket 12. A clutch 24 is provided that allows slippage of the shaft 18. Preferably, the shaft 18 is driven through bevel gears, not shown, actuated by movement of driver 25, as is known.

FIG. 3 illustrates the ball 22a and socket 12 at an extreme, rearward location of the shaft 18. The conical, flanged end 50 of the socket 12 has contacted the terminus 60 of housing 16 and further rearward movement of the shaft 18 must either actuate the clutch 24 or pull the ball 22a from the socket 12. Too often, the ball 22a will disengage from the socket 12 before the clutch activates.

This problem is eliminated by the invention described herein with reference to FIGS. 4-8. Herein, the improvement comprises a friction brake 26 that is positioned in the housing 16 and includes fingers 34. As the shaft 18 is adjusted rearwardly, the fingers 34 enter the conical flange 50 of the socket 12 and the terminal ends 38 of the fingers 34 engage a flat portion 36 formed with ball 22a. This feature is most clearly seen in FIG. 6. In this position the end surface 52 of conical flange 50 is still remote from the terminus 60 of body 16, thus allowing the action of the clutch 24 in preventing further longitudinal movement of the shaft 18 and maintaining the integrity of the ball and socket connection.

While it is possible to form the fingers 34 as an extension of the body 16, in the preferred embodiment the friction brake 26 (see FIG. 8) is formed as a separate component having a tubular body 28 with a first portion 30 and a second portion 32 that is comprised of the flexible fingers 34. Forming the friction brake as a separate component allows a greater choice of materials.

In the preferred embodiment of the invention, the first portion 30 of the friction brake 26 is positioned in a cavity 16a formed in the body 16.

Thus there is provided a simple mechanism that prevents the ball of an adjustment screw from disengaging from its associated ball socket.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. In an adjustment device having:
   a socket attached to an article to be adjusted;
   a housing remote from said article;
   a shaft moveable along a longitudinal axis in said housing, said shaft having a socket end engaging said socket; and
   a clutch to allow slippage of said shaft, the improvement comprising:
   a friction brake positioned in said housing and engaging said socket end of said shaft;
   wherein said socket is spherical and said socket end of said shaft engaging said socket is at least hemi-spherical, said friction brake comprises a tubular body and surrounds said shaft, a portion of said body has a solid wall that at least partially resides within said housing, a portion of said body is comprised of flexible fingers, said hemispherical end of said shaft has a flat portion extending in a direction transverse to said longitudinal axis, and the terminal ends of said flexible fingers engage said flat portion at the end of travel of said shaft.

* * * * *